(12) United States Patent
Ishida et al.

(10) Patent No.: US 8,757,127 B2
(45) Date of Patent: Jun. 24, 2014

(54) GAS ENGINE WITH SPARK PLUG AND BORE-COOLING HOLES

(75) Inventors: Michiyasu Ishida, Kanagawa (JP); Hideaki Okumura, Kanagawa (JP)

(73) Assignee: Mitsubishi Heavey Industries, Ltd., Tokyo (JP)

( * ) Notice: Subject to any disclaimer, the term of this patent is extended or adjusted under 35 U.S.C. 154(b) by 189 days.

(21) Appl. No.: 13/131,991

(22) PCT Filed: Dec. 25, 2009

(86) PCT No.: PCT/JP2009/071578
§ 371 (c)(1),
(2), (4) Date: Jun. 28, 2011

(87) PCT Pub. No.: WO2010/074224
PCT Pub. Date: Jul. 1, 2010

(65) Prior Publication Data
US 2011/0271930 A1 Nov. 10, 2011

(30) Foreign Application Priority Data
Dec. 26, 2008 (JP) ................................. 2008-335298

(51) Int. Cl.
*F02F 1/00* (2006.01)
(52) U.S. Cl.
USPC ............................ 123/254; 123/267; 123/275
(58) Field of Classification Search
CPC .......... F02B 19/00; F02B 19/08; F02B 19/12; F02B 19/1004; F02B 1/04; F02B 19/14; F02B 19/1028; F02B 19/04; F02B 19/02; H01T 13/54; F01P 3/16; F02P 13/00
USPC ................ 123/251, 253, 262, 274, 275, 280, 123/287–289, 290, 292, 266, 267, 273, 123/41.32
See application file for complete search history.

(56) References Cited

U.S. PATENT DOCUMENTS 1,181,122 A * 5/1916 Eastman ................... 123/143 B
(Continued)

FOREIGN PATENT DOCUMENTS

JP 63109275 A 5/1988
(Continued)

OTHER PUBLICATIONS

Japanese Office Action dated Jun. 18, 2012, with English Translation issued to corresponding Japanese Application No. 2009-297136.
(Continued)

*Primary Examiner* — Stephen K Cronin
*Assistant Examiner* — Carl Staubach
(74) *Attorney, Agent, or Firm* — Manabu Kanesaka; Kenneth M. Berner; Benjamin J. Hauptman (57) ABSTRACT

Provided is a check valve structure capable of preventing soot accumulation in a check valve arranged in a pre-combustion chamber (4) due to incomplete combustion of fuel gas and preventing malfunction the check valve (6) for a gas engine having an pre-combustion chamber with a spark plug. An arrangement for supplying fuel gas to the pre-combustion chamber (4) has a multiple bore-cooling holes (11s) disposed around the spark plug (10) for cooling a gasket (10f) formed in a mounting hardware piece (13), the holes having an lateral bore-cooling hole (11a), and a lateral bore-cooling hole (11b) with the gasket (10f) therebetween. Each of the holes further has a multiple bore-cooling holes (11s) parallel to the center axis (10a) of the spark plug. The mounting hardware piece (13) further has a check valve (6) communicating with a fuel gas inlet slot (5) between the lateral bore-cooling hole (11a) (inlet side) and the lateral bore-cooling hole (11b) (outlet side) for cooling water so that the check valve is cooled. A first check valve (22s) is provided upstream of a fuel gas inlet location (the junction) (14s) of the mounting hardware piece (13) with respect to the fuel flow to prevent reversed flow of fuel gas.

4 Claims, 3 Drawing Sheets

(56) References Cited

U.S. PATENT DOCUMENTS

| | | | | |
|---|---|---|---|---|
| 3,824,965 A | * | 7/1974 | Clawson | 123/275 |
| 4,058,091 A | * | 11/1977 | Tanahashi | 123/261 |
| 4,524,744 A | * | 6/1985 | Adams | 123/459 |
| 4,736,718 A | * | 4/1988 | Linder | 123/267 |
| 5,081,969 A | * | 1/1992 | Long, III | 123/274 |
| 5,222,993 A | * | 6/1993 | Crane | 123/256 |
| 5,662,082 A | * | 9/1997 | Black et al. | 123/254 |
| 6,019,081 A | * | 2/2000 | Divecha et al. | 123/254 |
| 6,513,483 B2 | * | 2/2003 | Riggs | 123/254 |
| 6,557,519 B1 | * | 5/2003 | Galbraith | 123/256 |
| 2002/0005182 A1 | * | 1/2002 | Kraus et al. | 123/169 C |

FOREIGN PATENT DOCUMENTS

| | | |
|---|---|---|
| JP | WO 91/12418 | 8/1991 |
| JP | U H07-025224 | 5/1995 |
| JP | H10-047064 | 2/1998 |
| JP | 10306725 A | 11/1998 |
| JP | 2001132603 A | 5/2001 |
| JP | 2003-254195 | 9/2003 |
| JP | 2007-100612 | 4/2007 |
| JP | 2008-267311 | 11/2008 |
| WO | WO 91/12418 A1 | 8/1991 |

OTHER PUBLICATIONS

WIPO, International Preliminary Report on Ppatentability, Aug. 16, 2011.

WIPO, PCT/ISA/210, PCT/ISA/220, PCT/ISA/237, Jan. 26, 2010.

* cited by examiner

GAS ENGINE WITH SPARK PLUG AND BORE-COOLING HOLES

RELATED APPLICATIONS

The present application is National Phase of International Application No. PCT/JP2009/071578 filed Dec. 25, 2009, and claims priority from, Japanese Application No. 2008-335298, filed Dec. 26, 2008, the disclosure of which is hereby incorporated by reference herein in its entirety.

BACKGROUND OF THE INVENTION

1. Field of the Invention

The present invention is applied to a gas engine provided with a spark plug, and relates to the gas engine provided with bore-cooling holes for cooling a circumferential space around the spark plug by use of a plurality of the bore-cooling holes.

2. Background of the Invention

Figure 3:
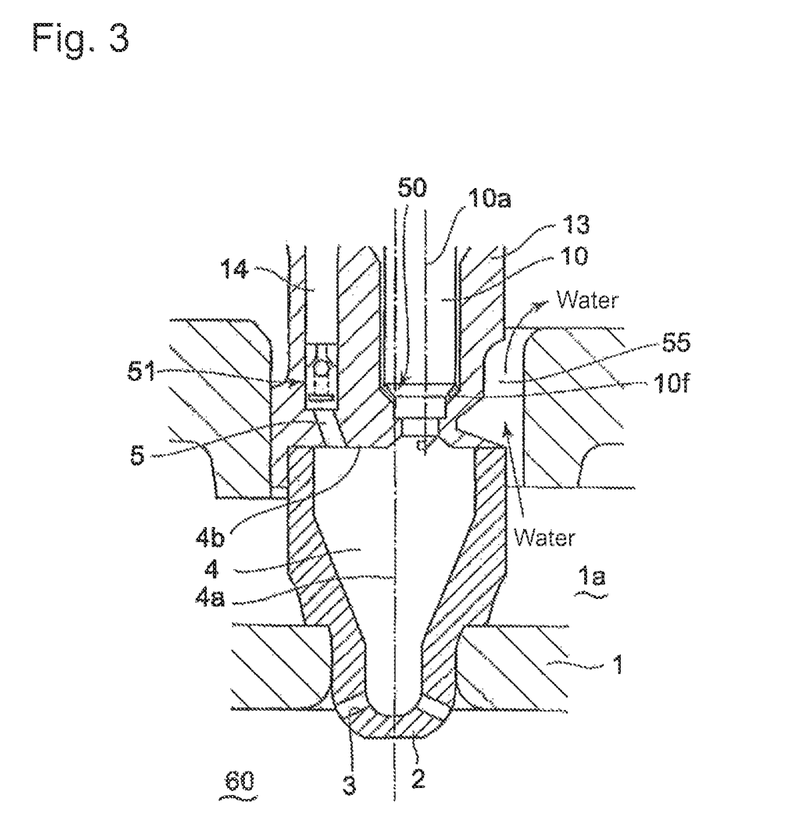
FIG. 3 explains a conventional technology corresponding to FIG. 1.

FIG. 3 shows a cross-section around a pre-combust ion chamber 4 of a conventional gas engine provided with a spark plug, the cross-section including the vertical center axis of the pre-combustion chamber.

In FIG. 3, a pre-combustion chamber forming-piece (a pre-combustion chamber mouthpiece) 2 is fastened to and on the bottom wall of a cylinder head 1, the pre-combustion chamber forming-piece being surrounded by a water chamber 1a; and, the pre-combustion chamber 4 is formed inside the pre-combustion chamber forming piece.

A mounting hardware piece 13 for mounting the spark plug 13 thrusts the pre-combustion chamber forming-piece 2 toward the bottom wall of the cylinder head 1; thus, the pre-combustion chamber forming-piece 2 is fixed in the cylinder head.

The spark plug 10 (which vertical center axis is shown with the line 10a in FIG. 3) is fitted on the mounting hardware piece 13 via a fitting seat surface 50 and a gasket 10f; the spark plug being thrust toward the fitting seat surface and the gasket.

Into the pre-combustion chamber, a fuel gas (for the pre-combustion in the pre-combust ion chamber) is Supplied through a fuel inlet passage 14f a solenoid controlled valve (not shown in FIG. 3) that is arranged at the upstream side of the fuel inlet passage 14, and a check valve 51 that is a unidirectional valve which automatically opens with forward flow and closes against reverse flow. While the check valve is being opened, the fuel gas streams into the pre-combustion chamber 4 (which vertical center axis is shown with the line 4a in FIG. 3) through a fuel gas inlet slot 5; the fuel gas having streamed into the chamber 4 is ignited by the spark discharge at the spark plug; thus, flames and combustion gas is generated in the pre-combust ion chamber 4.

Further, the flames and combustion gas generated in the pre-combustion chamber 4 gush into the main combustion chamber 60 through at least one torch jet nozzle 3 provided at the lower part of the pre-combustion chamber forming piece; the flames and combustion gas gushing into the main combustion chamber 60 ignite the lean, prefixed air-fuel mixture that is induced into the main chamber 60 through the intake air passages (not shown); and, the lean, prefixed air-fuel mixture burns in the main chamber 4.

A cooling water streaming space 55 surrounds a mounting hardware piece 13 for mounting the spark plug 10; during the operation of the gas engine, circulating cooling water streams through the cooling water streaming space 55; thus, the outer circumference of the mounting hardware piece 13 and the inside thereof are cooled so as to restrain the temperature, rise as to the sparkplug 10.

On the other hand, in parallel with the development trend for higher output and higher efficiency in the field of gas engines, in the gas engine with the configuration as described above, the temperature of the spark plug 10, the temperature in the neighborhood of the fitting seat (part) of the spark plug 10 and the temperature of the check valve 51 prone to rise. Thus, it becomes necessary to take counter measures to restrain the temperature rise regarding the spark plug 10 and the components surrounding the plug 10.

The patent reference 1 (JP7-25224 [a utility model application]) discloses a configuration in which the fuel gas is supplied to the pre-combustion chamber 1 (in the figure of the reference 1); the fuel gas supplied to the pre-combustion chamber 4 is ignited by the spark discharge at the spark plug; thus, flames and combustion gas is generated in the pre-combustion chamber 4; the flames and combustion gas generated in the pre-combustion chamber 4 gushes into the main combustion chamber so that the lean, premixed air-fuel mixture that is induced into the main chamber is ignited, and burns. In addition, around the fitting (seat) part for fitting the spark plug, a plurality of bore-cooling holes (not-penetrating holes) is arranged; and, the inside of the bore-cooling holes is cooled by streaming water. Thus, the neighborhood, of the spark plug is cooled.

Further, according to the patent reference 2 (JP2007-100642), a volume part of a hollow shape is provided inside the circumferential wall of the pre-combustion chamber 4; in the volume part, a heat-transfer medium is filled so that the components around the spark plug are cooled by the heat exchange between the heat-transfer medium and the combustion gas produced inside the pre-combustion chamber; thus, the temperatures of the components around, the spark plug are controlled.

As described above, in the gas engine provided with the spark plug, the spark plug, the neighborhood of the seat surface of the fitting part for the spark plug and the check valve are heated up to a considerably high temperature. Therefore, it becomes necessary to take counter measures to restrain the temperature rise regarding the spark plug 10 and the components surrounding the plug 10.

In parallel with the development trend for higher output and higher efficiency in the field of gas engines, the gas engine provided with the spark plug as shown in FIG. 3 has to cope with the temperature rise, as the temperature rise causes the shortened life of the spark plug 10; more concretely, with the temperature rise, the temperature of the electrode section (i.e. center electrode and earth electrode) also becomes high, and the wear of the electrode section is quickened. Further, when the temperature level of the electrode section exceeds an allowable maximum threshold, abnormal combustion is caused in addition to the wear of the electrode section; namely, the excessive temperature causes the spontaneous combustion of the fuel gas around the electrode section at unexpected time points.

Further, the gas engine comprising the spark plug is provided with the check valve 51 directly above the pre-combustion chamber 4; the pressure of the gas in the pre-combustion chamber 4 works on the check valve 51, under a high temperature condition, while the fuel gas in the pre-combustion chamber 4 is often difficult to burn completely; the imperfect combustion causes soot, and the soot generated in the pre-combustion chamber 4 tends to be collected around the check valve 51. The soot deposit often causes the adhesion of the check valve toward the fitting component thereof; and, the soot deposit often causes the poor condition of the seat surface between the check valve and the bearing component thereof. Therefore, it becomes necessary to further reduce the temperature of the check valve and the surrounding component.

Hereby, attention is again paid to the patent reference 1 (JP7-25224 [a utility model application]), which discloses a cooling system (structure) for cooling the components in the neighborhood of the spark plug 10 by streaming cooling water in the bore-cooling holes that are provided along the circumference of the fitting part for fitting the spark plug 10.

However, the structure disclosed by the patent reference 2 is limited within a system in which the bore-cooling holes are provided simply at the circumference of the fitting part of the spark plug 10, and the neighborhood of the fitting part of the spark plug 10 is just cooled; namely, the patent reference 2 does not discloses a cooling means for cooling the whole part including the spark plug 10 and the check valve 51 by use of the bore-cooling approach; in addition, the patent reference 2 does not discloses an improving means for improving the cooling effect of the cooling structure on the fuel inlet connecting piece that has an inner passage through which the fuel gas is supplied to the pre-combustion chamber.

REFERENCES

Patent References

Patent Reference 1: JP7-25224 [a utility model application]
Patent Reference 2: JP2007-100642

SUMMARY OF THE INVENTION

In view of the subjects in the conventional technologies as described above, the present invention aims at disclosing a gas engine provided with a spark plug thereby, by use of a bore-cooling hole approach, the neighborhood of the fitting seat for the spark plug as well as the heated-up part of the fuel inlet connecting piece can be cooled; further, the present invention aims at preventing the soot deposit due to the imperfect combustion in the pre-combustion chamber from adhering to the circumference of the check valve that is provided just above the pre-combustion chamber as well as near to the fuel discharge end side of the fuel inlet connecting piece, so that the malfunction of the check valve 6 can be prevented from occurring.

In order to find the solutions for the subjects of the conventional technologies, the present invention discloses a gas engine with a spark plug that ignites fuel gas supplied into an pre-combustion chamber, the fuel gas being sent out from a solenoid valve arranged at an upstream side of a fuel inlet connecting piece and flown through a fuel inlet passage formed inside said fuel inlet connecting piece is supplied to the pre-combustion chamber via a mounting hardware piece for mounting the spark plug with which said fuel inlet connecting piece forms a joint, said mounting hardware piece being arranged above the pre-combustion chamber; said sparkplug fitted on a seat surface of said mounting hardware piece for mounting the spark plug ignites the fuel gas in the pre-combustion chamber by spark discharge; wherein, a plurality of bore-cooling holes is arranged in the mounting hardware piece for mounting the spark plug in a manner such that the bore-cooling holes surround the seat surface on which the spark plug is seated and each of the bore-cooling holes is parallel to a center axis of the spark plug, each of the bore-cooling holes being provided with an inlet side lateral bore-cooling hole and an outlet side lateral bore-cooling hole at a bottom and top thereof in a direction of the center axis respectively such that the height level where the seat surface is positioned is between the height level of the inlet side lateral bore-cooling hole and the height level of the outlet side lateral bore-cooling hole; and said fuel inlet passage formed inside said fuel inlet connecting piece, of which an end side enters the mounting hardware piece for mounting the spark plug, is arranged to be between two of the bore-cooling holes that are both next to the end side of the fuel inlet passage, so that said seat surface and said fuel inlet passage are cooled by streaming cool water from said inlet side lateral bore-cooling hole to said, outlet side lateral bore-cooling hole via a vertical bore-cooling hole in between.

A preferable embodiment of the present invention is the gas engine provided with the bore-cooling holes, wherein a second, check valve is coupled to said fuel inlet passage which is positioned between the height level of the outlet side lateral bore-cooling hole and the height level of the in let side lateral bore-cooling hole.

Another preferable embodiment of the present invention is the gas engine provided with the bore-cooling holes according to claim 1, wherein a first check valve is provided in the fuel inlet passage, the position of the first check valve being on a downstream side of said solenoid valve as well as being on an upstream side of an end side of the fuel inlet, connecting piece.

According to the present invention, in a spark ignition gas engine with a spark plug that ignites fuel gas supplied into an pre-combustion chamber, the mounting hardware piece for mounting the spark plug is provided; further, a plurality of bore-cooling holes are arranged in the mounting hardware piece; thereby each of the multiple bore-cooling holes comprises a vertical bore-cooling hole, an inlet side lateral bore-cooling hole and an outlet side lateral bore-cooling hole, and the vertical bore-cooling hole is parallel with a center axis, namely, the longitudinal center axis of the spark plug; each inlet side lateral bore-cooling hole communicates with the outlet side lateral bore-cooling hole through the vertical bore-cooling hole, so that cooling water streams through each of the multiple bore-cooling holes, in order that the mounting hardware piece and the spark plug are cooled; the multiple bore-cooling holes 11s are arranged so as to surround the seat surface on which the spark plug is seated; the height level of the seat surface is located between the height level of the outlet side latera bore-cooling hole and the height level of the inlet side lateral bore-cooling hole;
further, the longitudinal axis of the fuel inlet connecting piece in which the fuel inlet passage is formed is at right angles to the center axis, namely, the vertical bore-cooling holes (as well as the longitudinal center axis of the spark plug); the end side of the fuel inlet passage of the fuel inlet connecting piece that enters the mounting hardware piece for mounting the spark plug is arranged between two vertical bore-cooling holes 11 that are both next to the end side of the fuel inlet passage in order that not only the seat surface but also the fuel inlet passage are cooled by streaming cooling water through the bore-cooling holes.

With the arrangements of the cooling system as described above, the high temperature area around the seat surface can be cooled thanks to the cooling water streaming through the bore-cooling holes. Further, since the check valve holder housing the second check valve is placed between two vertical bore-cooling holes 11 that are both next to the end side of the fuel inlet passage of the fuel inlet connecting piece that enters the mounting hardware piece for mounting the spark plug is can be cooled. Thus, not only the neighborhood of the seat surface but also the fuel inlet passage can be surely cooled to a temperature lower than an allowable limit.

Further, according to the present invention, a second check valve is provided between the height level of the outlet side lateral bore-cooling hole and the height level of the inlet side lateral bore-cooling hole, on a part way of a fuel gas passage that connects the space inside the pre-combustion chamber and the end side of the fuel inlet passage of the fuel inlet connecting piece that enters the mounting hardware piece for mounting the spark plug; thus, the second check valve can be arranged near to the bore-cooling hole; and, the second check valve can be surely cooled.

Thus, even in a case where the second check valve is arranged above and near to the pre-combustion chamber, the temperature rise during the gas engine operation can be restrained; by decreasing the maximum temperature of the second check valve in a case where the second check valve is arranged above and near to the pre-combustion chamber, the soot generation due to the incomplete combustion of the fuel gas can be prevented; further, the malfunction of the check valve can be prevented from occurring.

In this way, firstly, the second check valve can be arranged above and near to the pre-combustion chamber; secondly, the fuel inlet passage also can be cooled; thus, in a case where the first check valve installed on the part way of the fuel inlet passage at the inlet side thereof the valve which automatically opens with the forward flow, namely, the fuel gas flow toward the pre-combustion chamber, the first check valve can be placed near to the second check valve. In other words, the space waste regarding the volume between the first check valve and the second check valve can be dispensed with. Incidentally, the existence of the space waste means that there is the flammable gas therein which dose not contribute to the immediate combustion.

As described above, the high temperature area around the spark plug can be surely cooled by providing the bore-cooling holes, the high temperature area being the area in the neighborhood of the contact surface between the outer circumference of the spark plug and the inner circumference of the mounting hardware piece for mounting the spark plug. Further the second, check valve can be surely cooled by providing the bore-cooling holes, the check valve being arranged above and near to the pre-combustion chamber and heated-up to a high temperature; it is hereby noted that the fuel inlet connecting piece is connected to the mounting hardware piece for mounting the spark plug; the fuel gas that passes the fuel gas inlet location (the junction) reaches the second check valve placed at the lower side of the check valve insert hole.

Further, according to the present invention, a first check valve is provided on the downstream side of the solenoid valve, in the fuel inlet passage that is formed inside the fuel, inlet connecting piece, on the upstream side of the end side of the fuel inlet passage of the fuel inlet connecting piece that enters the mounting hardware piece for mounting the spark plug, the first check valve streaming fuel gas only toward forward direction. Thus, the first check valve in the fuel inlet passage is cooled; the cooled first check valve contributes to the cooling of the streaming gas as well as the second check valve, so that not only the first check valve but also the second check valve are prevented from causing malfunctions.

Further, the first check valve which temperature rise is also restrained prevents the occurrence of the malfunction regarding the second check valve; accordingly, the leakage of the combustion gas from the pre-combustion chamber toward the fuel, gas passage is shut; in this way, the leakage gas is prevented from entering the solenoid valve, the first check valve that temperature rise is also restrained prevents the occurrence of the malfunction regarding the second check valve; accordingly, the leakage of the combustion gas from the pre-combustion chamber toward the fuel gas passage is shut; in this way, the leakage gas is prevented from entering the solenoid valve.

DETAILED DESCRIPTION OF THE PREFERRED EMBODIMENTS

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

Figure 1:
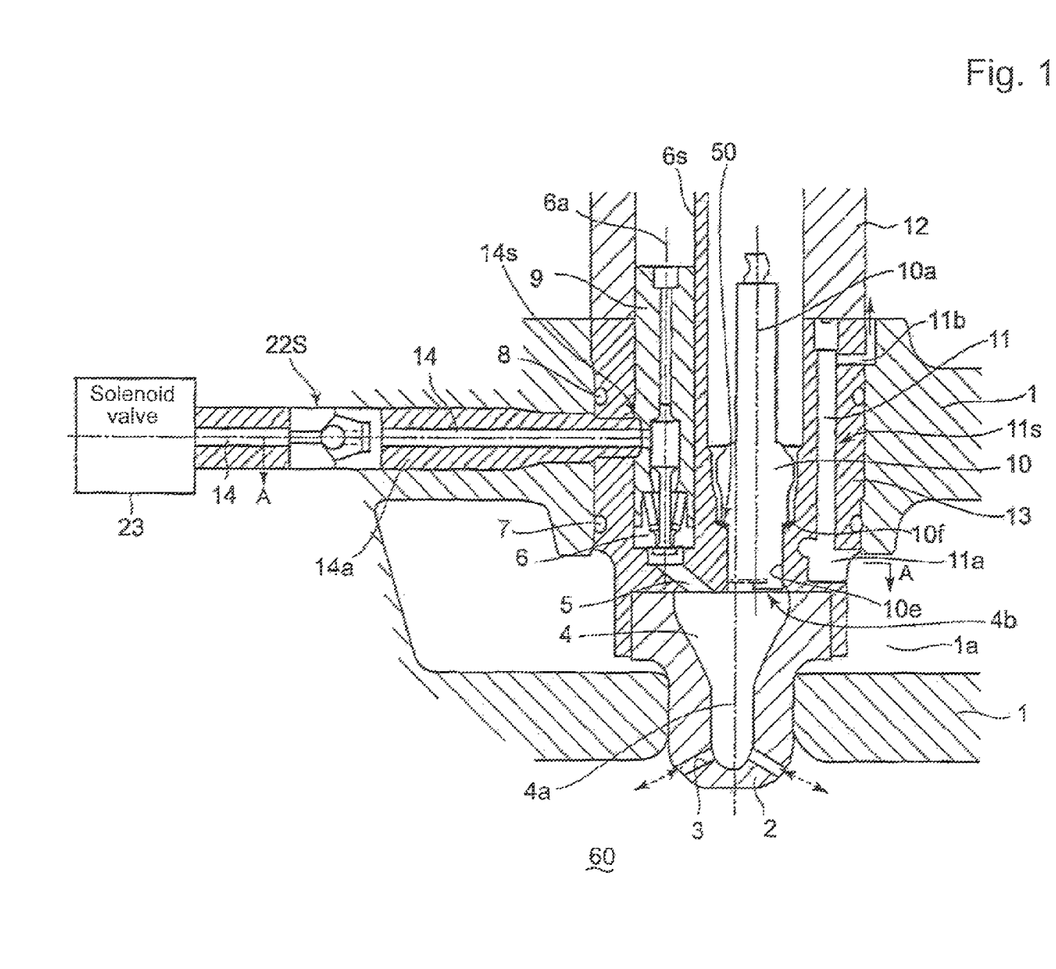
FIG. 1 is a cross-section along a center axis of an pre-combustion chamber of a gas engine provided with a spark plug, showing the pre-combustion chamber and surrounding thereof according to an embodiment of the present invention.
Figure 2:
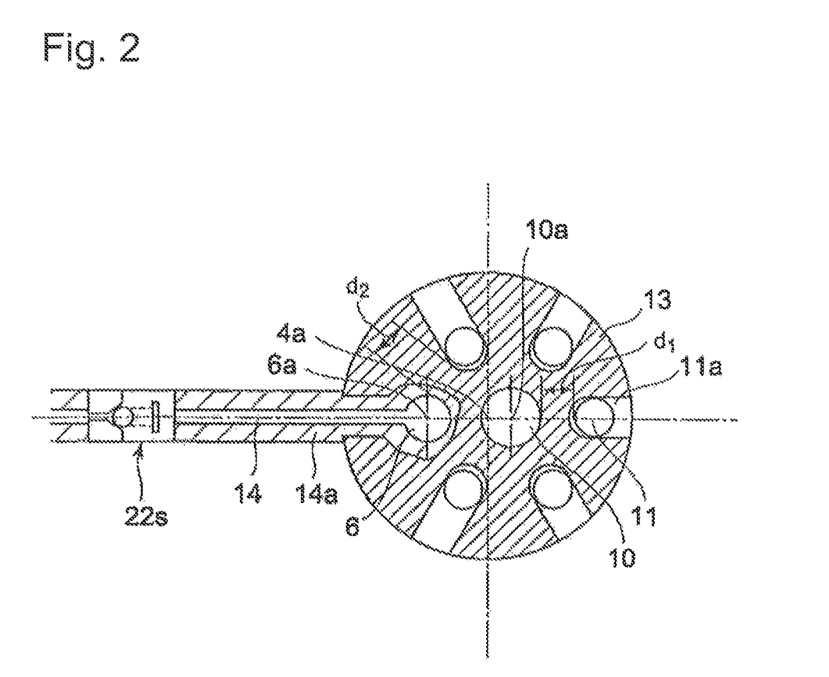
FIG. 2 shows A-A cross-section of FIG. 1 according to the embodiment.

FIG. 1 is a cross-section along a center axis of an pre-combustion chamber of a gas engine provided with a spark plug, showing the pre-combustion chamber and surrounding thereof according to an embodiment of the present invention, and FIG. 2 shows A-A cross-section of FIG. 1 according to the embodiment of the present invention.

In FIG. 1, an pre-combustion chamber forming-piece 2 is fastened to a bottom wall of a cylinder head 1, the pre-combustion chamber forming-piece 2 being surrounded by a water chamber 1a, and an pre-combustion chamber 4 (4a indicates a center axis of the pre-combustion chamber) is formed, inside the pre-combustion chamber forming-piece 2. A mounting hardware piece 13 and a thrusting hardware piece 12 thrust a top side 4b of the pre-combustion chamber forming-piece 2 such that, the pre-combustion chamber forming-piece 2 is fixed in the cylinder head 1.

A spark plug 10 (10a shows a vertical center axis of the spark plug) is fitted on the mounting hardware piece 13 via a fitting seat surface 50 and a gasket 10f, the spark plug 10 being thrust toward the fitting seat surface 50 and the gasket 10f. An o-ring 7 and an o-ring 8 are fitted into the circumference of the mounting hardware piece 13.

As to the spark plug 10, a spark plug of a flat type that has an ordinary center electrode and an ordinary earth electrode is preferably used, but a spark plug of what they call J-shape type may be also used.

The configuration described above is the same as the conventional configuration described in FIG. 3. The present invention relates to the improvement regarding the bore-cooling holes in the gas engine as described thus far.

In the circumference of the fitting seat part of the spark plug 10, a plurality of bore-cooling holes 11s is provided, each of which is configured with a lateral bore-cooling hole 11a (an inlet hole) at the lower side of the hole 11s, a vertical bore-cooling hole 11 along the center axis 10a of the spark plug 10, and a lateral bore-cooling hole 11b (an outlet hole) at the upper side of the hole 11s, so that the cooling water streams from the lateral bore-cooling hole 11a to the lateral bore-cooling hole 11b trough the vertical bore-cooling hole 11.

It is hereby noted that, as long as the vertical bore-cooling hole 11 is constructed such that the center line thereof is in the direction along the center axis 10a of the spark plug 10, each of the holes 11 may be constructed to be slanted against the center axis 4a of the pre-combustion chamber 4 with a certain angle.

Further, in the example of FIG. 1, a check valve insert hole 6s in which a second check valve 6 is inserted is car ranged so that the center axis 6a of the check valve insert hole 6s is parallel to the center axis 10a of the inside hollow space of the mounting hardware piece 13 for mounting the spark plug 10. A fuel inlet connecting piece 14a comprising a fuel inlet passage 14 and a first check valve 22s therein is provided such that the center axis of the fuel inlet connecting piece 14a lies at right angles to the mounting hardware piece 13 so that the fuel inlet connecting piece 14a is fastened thereto.

At the upper stream side of the first check valve 22S, a solenoid (controlled) valve 23 for controlling fuel gas supply is provided. From the solenoid valve 23, fuel gas is supplied to the pre-combustion chamber through the fuel inlet passage 14 that is a passage bored in the fuel inlet connecting piece 14a along the longitudinal center axis of the piece 14a.

The fuel inlet connecting piece 14a is formed as a piece separate from, the mounting hardware piece 13 for the spark plug; the fuel inlet connecting piece 14a is fastened to the mounting hardware piece 13 at a junction 14s that is a fuel gas inlet location regarding a check valve holder of the second check valve 6, by means of a fastening method such as a screw-in method.

Further, the center axis 6a of the check valve insert hole 6s is arranged so as to be parallel to the center axis 10a of the spark plug 10; at the lower location of the check valve insert hole 6s as well as over and near the top side 4h of the pre-combustion chamber 4, the second check valve 6 is placed being housed by a check valve holder 9; naturally, the second check valve 6 automatically opens with the forward flow, namely, the fuel gas flow toward the pre-combustion chamber 4.

Further, the first check valve 22S is provided to the fuel inlet passage 14 formed inside the fuel inlet connecting piece 14a, between the junction (the fuel gas inlet location) 14s and the solenoid valve 23 for controlling the fuel gas supply so that the fuel gas is directed only to the direction of the flow of the fuel gas supply.

More in detail, the center axis of the fuel inlet connecting piece 14a in which the fuel inlet, passage 14 is formed, is arranged so as to be orthogonal to the center axis 6a of the check valve insert hole 6s. The center axis 6a of the check valve insert hole 6s is arranged such that the center axis 6a is parallel to the center-axis 10a of the spark plug 10; incidentally, the second check valve 6 is arranged just above the pre-combustion chamber 4 in the check valve insert hole 6s. Thus, the first check valve 22S is placed inside the fuel inlet connecting piece 14a.

Further, as shown in FIGS. 1 and 2, the height level of the fuel inlet connecting piece 14a in which the fuel inlet passage 14 is arranged to be placed between the lateral bore-cooling hole (inlet side) 11a and the lateral bore-cooling hole 11b (outlet side); it is hereby noted chat each of the multiple bore-cooling holes 11s comprises the vertical bore-cooling hole 11, a lateral bore-cooling hole 11a and a lateral bore-cooling hole 11b; and, the fuel inlet connecting piece 14a is connected to the mounting hardware piece 13; the fuel gas that passes the fuel gas inlet location (the junction) 14s reaches the second check valve 6 placed at the lower side of the check valve insert hole 6s.

Further, a plurality of bore-cooling holes 11s are provided in a circumferential direction, each of the bore-cooling hole 11a comprising the lateral bore cooling hole (inlet side) 11a communicating with the corresponding lateral bore-cooling hole (outlet side) 11b via the corresponding vertical bore-cooling hole 11 which is constructed to be parallel to the center axis 10a of the spark plug. The multiple bore-cooling holes 11s are arranged so as to surround the seat surface 50 on which the spark plug 10 is seated.

With the arrangements of the cooling system as described above, the nigh temperature area between the outer circumference of the spark plug 10 and the inner circumference of the mounting hardware piece 13 (for mounting the spark plug 10) can be cooled thanks to the cooling water streaming through the vertical bore-cooling holes 11, the nigh temperature area hereby being the contact surface 10e between the outer circumference and the inner circumference. Moreover, the high temperature area around the seat surface 50 can be cooled thanks to the cooling water streaming through the bore-cooling holes 11s. Furthermore, since the check valve holder 9 housing the second check valve 6 is placed between two vertical, bore-cooling holes 11 that are both, next to the check valve holder 9, the neighborhood of the second check valve 6 can be cooled. Thus, not only the neighborhood of the seat surface 50 but also the fuel inlet passage 14 can be surely cooled to a temperature lower than an allowable limit.

In addition, the height level of the fuel inlet connecting piece 14a in which the fuel inlet passage 14 is arranged so that the height position thereof is placed between the lateral bore-cooling hole (inlet side) 11a and the lateral bore-cooling hole 11b (outlet side); namely, at the height level, the junction 14s of the fuel inlet passage 14 and the check valve holder 9 exists; thus, the second check valve 6 is cooled by the cooling water streaming through the bore-cooling hole 11, also from the middle part side of the check valve holder 9. Hence, the check valve 6 that is arranged above and near to the pre-combustion chamber 4 can be surely cooled.

Accordingly, even in a case where the second check valve 6 is arranged above and near to the pre-combustion chamber 4, the temperature rise during the gas engine operation can be restrained; by decreasing the maximum temperature of the second check valve 6 in a case where the second check valve 6 is arranged above and near to the pre-combustion chamber 4, the soot generation due to the incomplete combustion of the fuel gas can be prevented; further, the malfunction of the check valve 6 can be prevented from occurring.

In this way, firstly, the second check valve 6 can be arranged above and near the pre-combustion chamber 4; secondly, the fuel in let passage 14 also can be cooled; thus, in a case where the first check valve 223 is installed on the part way of the fuel inlet passage 14 at the inlet side thereof the valve 22S which automatically opens with the forward flow, namely, the fuel gas flow toward the pre-combustion chamber 4, the first check valve 22S can be placed near to the second check valve 6. In other words, the space waste regarding the volume between the first check valve 22S and the second check valve 6 can be dispensed with.

As described above, the high temperature area around the spark plug 10 can be surely cooled by providing the bore-cooling holes 11s, the high temperature area being the area in the neighborhood of the contact surface 10e between the outer circumference of the spark plug 10 and the inner circumference of the mounting hardware piece 13 for mounting the spark plug 10, Further the second check valve 6 can be surely cooled by providing the bore-cooling holes 11s, the check valve 6 being arranged above and near to the pre-combustion chamber 4 and heated-up to a high temperature; it is hereby noted that the fuel inlet connecting piece 14*a* is connected, to the mounting hardware piece 13 for mounting the spark plug 10; the fuel gas that passes the fuel gas inlet location (the junction) 14*s* reaches the second check valve 6 placed at the lower side of the check valve insert hole 6*s*.

FIG. 2 shows A-A cross-section of FIG. 1; A-A cross-section includes a horizontal cross-section that, includes the longitudinal center axis of the fuel inlet connecting piece 14*a*. In FIG. 2, the arrangement of the bore-cooling holes 11*s* along a hoop direction is shown; multiple vertical bore-cooling holes 11 surround the spark plug 10. Further, the check valve holder 9 housing the second check valve 6 is placed between two vertical bore-cooling holes 11 that are both next to the check valve holder 9. As shown in FIG. 2, the distance d1 between the spark plug 10 and the vertical bore-cooling hole 11 is made as short as possible; the distance 62 between the check valve 6 and the vertical bore-cooling hole 11 is made as short as possible. Thus, the cooling effect by the bore-cooling configuration can be maximized.

According to the configuration as described above, the heat accumulated in the neighborhood of the contact surface 10*e* can be transferred to the mounting hardware piece 13 for mounting the spark plug 10 by streaming cooling water through the bore-cooling holes 11*s*, the contact surface 10*e* being between the outer circumference of the spark plug 10 and the inner circumference of the mounting hardware piece 13 for mounting the spark plug 10; thus, the high temperature area in the neighborhood of the contact surface 10*e* can be surely cooled thanks to the cooling effects of the bore-cooling configuration; and the high temperature level can be restrained to a temperature lower than a predetermined threshold.

Further, as shown in FIG. 2 that shows horizontal cross-section that includes the longitudinal center axis of the fuel inlet connecting piece 14*a*, multiple bore-cooling holes 11*s* surround the spark plug 10 so as to surround the seat surface 50 on which the spark plug is pressed, along the outer circumference of the seat surface 50; further, the bore-cooling holes 11*s* are arranged so as to be placed as close to the second check valve 6 that is placed above and near to the pre-combustion chamber 4, in order to cool the second check valve 6 (cf. the distance d2 in FIG. 2). With the configuration just described, the bore-cooling holes 11*s* can be so closer to the outer circumference of the seat surface 50 and the second check valve 6 that both areas (the outer circumference of the seat surface 50 and the neighborhood of the second check valve 6 that is placed above and near to the pre-combustion chamber 4 and heated up to a high temperature) are effectively cooled.

Thus, the temperature of the second check valve 6 can be reduced to a temperature lower than a predetermined threshold, the second check valve 6 being placed above and near to the pre-combustion chamber 4 and heated up to a high temperature; further, in particular, since the temperature rise regarding the second check valve 6 (that is placed above and near to the pre-combustion chamber 4 and heated up to a high temperature) can be reduced, the soot generation due to the incomplete combustion of the fuel gas can be prevented; further, the malfunction of the check valve 6 can be prevented from occurring.

Still further, according to the above-described embodiment, aside from the effect of cooling down the high temperature area regarding the second check valve 6 (that is placed above and near to the pre-combustion chamber 4 and heated up to a high temperature) toward a condition of a temperature lower than a predetermined threshold; further, restraining the temperature of the first check valve 22 within a low temperature prevents the second check valve 6 from causing the malfunction thereof; accordingly, the leakage of the combustion gas from the pre-combustion chamber toward the fuel gas passage is shut; in this way, the leakage gas is prevented from entering the solenoid valve 23, and the protection of the solenoid valve 23 is achieved.

INDUSTRIAL APPLICABILITY

As described thus far, the present invention can provide a gas engine provided with a spark plug thereby, by use of a bore-cooling hole approach, the neighborhood of the fitting seat for the spark plug as well as the heated-up part of the fuel inlet connecting piece can be cooled; further, the soot deposit due to the imperfect combustion in the pre-combustion chamber is prevented, from adhering to the circumference of the check valve that is provided just above the pre-combustion chamber as well as near to the fuel discharge end side of the fuel inlet connecting piece, so that the malfunction of the check valve 6 can be prevented.

The invention claimed is:

1. A gas engine comprising:

a spark plug that is configured to ignite fuel gas supplied into a pre-combustion chamber, the fuel gas sent out from a solenoid valve arranged at an upstream side of a fuel inlet connecting piece, and flown through a fuel inlet passage formed inside said fuel inlet connecting piece, being supplied to the pre-combustion chamber via a mounting hardware piece for mounting the spark plug with which said fuel inlet connecting piece forms a joint, said mounting hardware piece being arranged above the pre-combustion chamber; said spark plug fitted on a seat surface of said mounting hardware piece igniting the fuel gas in the pre-combustion chamber by spark discharge, wherein a pre-combustion chamber forming-piece is fixed to a bottom wall of a cylinder head, the pre-combustion chamber forming-piece being surrounded by a water chamber and forming the pre-combustion chamber inside, the mounting hardware piece for mounting the spark plug being fixed to a top side of the pre-combustion chamber inside the pre-combustion chamber forming piece, a plurality of bore-cooling holes is arranged in the mounting hardware piece in a manner such that the bore-cooling holes surround the seat surface on which the spark plug is seated and extend parallel to a center axis of the spark plug, each of the bore-cooling holes being provided with an inlet side lateral bore-cooling hole and an outlet side lateral bore-cooling hole at a bottom and a top of the bore-cooling hole in a direction of the center axis, respectively, such that a height level where the seat surface is positioned is between a height level of the inlet side lateral bore-cooling hole and a height level of the outlet side lateral bore-cooling hole, a check valve insert hole is formed parallel to the center axis of the spark plug inside the mounting hardware piece, a junction of said fuel connecting piece and said mounting hardware piece is positioned in an axial section between the height level of the inlet side lateral bore-cooling holes and the height level of the outlet side lateral bore-cooling holes;

a first check valve which is configured to open with the fuel gas flow toward the pre-combustion chamber, is positioned inside the check valve insert hole and in an axial section between the height level of the inlet side lateral bore-cooling hole and the height level of the outlet side lateral bore-cooling hole; and said plurality of bore-cooling holes is arranged along a hoop direction around the spark plug so that the plurality of bore-cooling holes surrounds the spark plug in a radial direction and the first check valve in a circumferential direction in a same horizontal cross-section so that cool water from the water chamber flows from said inlet side lateral bore-cooling hole to said outlet side lateral bore-cooling hole via a vertical bore-cooling hole in between so as to cool said seat surface and the first check valve.

2. The gas engine according to claim 1, wherein a second check valve is provided in the fuel inlet passage, the second check valve being positioned on a downstream side of said solenoid valve as well as being on an upstream side of an end side of the fuel inlet connecting piece.

3. The gas engine according to claim 2, wherein the first and second check valves are serially interposed between the pre-combustion chamber and the solenoid valve.

4. The gas engine according to claim 2, wherein a center axis of the fuel inlet connecting piece in which the fuel inlet passage is formed is disposed so as to be orthogonal to a center axis of a check valve insert hole in which the first check valve is disposed.

* * * * *